(12) United States Patent
Li

(10) Patent No.: US 11,259,387 B2
(45) Date of Patent: Feb. 22, 2022

(54) OLED LIGHT SOURCE DRIVE CONTROL CIRCUIT AND OLED LAMP

(71) Applicant: HASCO VISION TECHNOLOGY CO., LTD., Shanghai (CN)

(72) Inventor: Jiaying Li, Shanghai (CN)

(73) Assignee: HASCO VISION TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/957,383

(22) PCT Filed: Nov. 23, 2018

(86) PCT No.: PCT/CN2018/117192
§ 371 (c)(1),
(2) Date: Jun. 28, 2020

(87) PCT Pub. No.: WO2020/052077
PCT Pub. Date: Mar. 19, 2020

(65) Prior Publication Data
US 2021/0219402 A1    Jul. 15, 2021

(30) Foreign Application Priority Data

Sep. 13, 2018  (CN) .......................... 2018110693705
Sep. 13, 2018  (CN) .......................... 2018215019201

(51) Int. Cl.
H05B 45/60      (2022.01)
H05B 47/18      (2020.01)
(Continued)

(52) U.S. Cl.
CPC .......... *H05B 45/60* (2020.01); *B60Q 1/0088* (2013.01); *H05B 45/34* (2020.01); *H05B 45/345* (2020.01);
(Continued)

(58) Field of Classification Search
CPC ...... H05B 45/34; H05B 45/37; H05B 45/345; H05B 45/60; H05B 47/18; H05B 47/165; B60Q 1/0088
See application file for complete search history.

(56) References Cited

FOREIGN PATENT DOCUMENTS

CN      101365276 A      2/2009
CN      202043357 U      11/2011
(Continued)

*Primary Examiner* — Henry Luong

(57) ABSTRACT

The present disclosure provides an OLED light source drive control circuit and an OLED lamp. The drive control circuit includes a DC/DC constant voltage module, an external transceiver, a first internal transceiver, a microcontroller unit, a linear constant current module, and an OLED panel and a light source. The microcontroller unit communicates with the first internal transceiver, feeds back the detected output voltage to the DC/DC constant voltage module, and controls the DC/DC constant voltage module to operate. The first internal transceiver is connected with the linear constant current module through a differential bus. The linear constant current module includes a plurality of linear constant current driver ICs, each contains a second internal transceiver, and a differential bus interface of the second internal transceiver is respectively connected with a differential bus communication line connecting with a differential bus interface of the first internal transceiver. The present disclosure has a stronger anti-interference ability and effectively improves the circuit conversion efficiency of the entire drive system.

12 Claims, 12 Drawing Sheets

(51) Int. Cl.
*H05B 45/345* (2020.01)
*H05B 45/34* (2020.01)
*H05B 45/37* (2020.01)
*H05B 47/165* (2020.01)
*B60Q 1/00* (2006.01)

(52) U.S. Cl.
CPC .......... *H05B 45/37* (2020.01); *H05B 47/165* (2020.01); *H05B 47/18* (2020.01)

(56) References Cited

FOREIGN PATENT DOCUMENTS

| | | | |
|---|---|---|---|
| CN | 206674258 U | * | 11/2017 |
| CN | 206674258 U | | 11/2017 |
| CN | 207140933 U | * | 3/2018 |
| CN | 207140933 U | | 3/2018 |
| GB | 2365231 B | | 9/2004 |

* cited by examiner

OLED LIGHT SOURCE DRIVE CONTROL CIRCUIT AND OLED LAMP

CROSS REFERENCES TO RELATED APPLICATIONS

This is a Sect. 371 National Stage of PCT International Application No. PCT/CN2018/117192 filed on 23 Nov. 2018, which claims the priority of a Chinese Patent Application No. CN 2018110693705 filed with CNIPO on 13 Sep. 2018, and a Chinese Patent Application No. CN 2018215019201 filed with CNIPO on 13 Sep. 2018, the contents of the applications hereby being incorporated by reference in their entireties for all purposes.

BACKGROUND

Field of Disclosure

The present disclosure relates to the technical field of vehicle lamps, in particular to the technical field of vehicle Organic Light-Emitting Diode (OLED) lamps, and in particular to an OLED light source drive control circuit and an OLED lamp.

Description of Related Arts

As the preferred light source for vehicle signal lights, Light-Emitting Diode (LED) has been widely and maturely used in vehicle signal lights with various functions. However, when LED is used as a point light source and applied to signal lights with a certain function in vehicle tail lights, multiple LEDs are commonly required to achieve a function. For the luminous effect of multiple LEDs, it is difficult to achieve good luminous uniformity without relying on the cooperation of a good optical reflection system and a light distribution mirror. The OLED products have two major advantages: on the one hand, their self-luminous characteristics do not require the support of any light source system, and the thickness of the OLED light emitter is only 1.4 mm. In the future, tail lights may even be pasted on the vehicle like a sticker, without occupying the space of the vehicle. The OLED products have greater advantages in volume compared with the ordinary LED products. On the other hand, compared with the point light source LED, OLED products have the characteristics of panel light source and diffuse reflection, and the light quality is uniform, thereby achieving step-less dimming without casting any shadows. Because OLED is light and soft and has good light quality, it can play a very important role in the vehicle lighting field in terms of energy-saving or design. The thickness of the OLED panel is becoming thinner, the color of the panel varies from monochrome to multi-color, and the OLED panel changes from rigid panels to flexible panels, which makes OLED lighting technology continue to mature.

At present, the drive part of the conventional OLED drive control system of the vehicle lamp uses a complete linear constant current mode and an independent control light source mode. The 10 port of the single-chip microcomputer is directly connected with the switch group to open or close the Pulse Width Modulation (PWM) dimming port of the multi-line constant current chip, referring to patent No. ZL201720614078.1. This kind of drive method has low drive efficiency and uses more 10 ports of single-chip microcomputer resources, and the wiring harness is complicated, which is not good for expandability and platformization. And with the poor Electromagnetic Compatibility (EMC) anti-interference ability, when there is strong electromagnetic interference from outside, the OLED drive control circuit is easily interfered, causing the OLED to emit light abnormally.

SUMMARY

The present disclosure provides an OLED light source drive control circuit, including a DC/DC constant voltage module, an external transceiver, a first internal transceiver, a microcontroller unit, a linear constant current module, and an OLED panel light source.

The DC/DC constant voltage module is connected with a positive pole of a vehicle power line and outputs power to the external transceiver, the first internal transceiver, the microcontroller unit, and the linear constant current module, respectively.

One end of the external transceiver is connected with a vehicle communication line, and the other end of the external transceiver is connected with the microcontroller unit, the external transceiver receives a control signal transmitted by the vehicle communication line and transmits the control signal to the microcontroller unit for the microcontroller unit to execute a control instruction corresponding to the control signal.

The microcontroller unit communicates with the first internal transceiver, detects an output voltage of the linear constant current module, feeds back the detected output voltage to the DC/DC constant voltage module for the DC/DC constant voltage module to adjust the output voltage output to the linear constant current module, and controls the DC/DC constant voltage module to operate according to the detected output voltage or a voltage fed back by the linear constant current module.

The first internal transceiver is connected with the linear constant current module through a differential bus to transmit a signal between the microcontroller unit and the linear constant current module.

The linear constant current module comprises a plurality of linear constant current Integrated chips (ICs), the plurality of linear constant current driver ICs each contains a second internal transceiver, and a differential bus interface of the second internal transceiver is connected with a differential bus communication line connecting with a differential bus interface of the first internal transceiver, to communicate with the differential bus interface of the first internal transceiver.

The OLED panel light source comprises a plurality of OLED panels corresponding to the plurality of linear constant current driver ICs respectively, each of the plurality of OLED panels is controlled to emit light by an output channel of the each output channel corresponds to an OLED light-emitting area.

The ground ends of the DC/DC constant voltage module, the external transceiver, the first internal transceiver, the microcontroller unit, the linear constant current module, and the OLED panel light source are respectively connected with a negative pole of the vehicle power line.

In an embodiment of the present disclosure, an anti-reverse circuit is further connected with a line between the DC/DC constant voltage module and the vehicle power line.

In an embodiment of the present disclosure, the anti-reverse circuit comprises an anti-reverse diode or an anti-reverse PMOS circuit.

In an embodiment of the present disclosure, the external transceiver is a LIN transceiver, the vehicle communication line is a LIN communication line; or the external transceiver is a CAN transceiver, and the vehicle communication line is a CAN communication line.

In an embodiment of the present disclosure, the external transceiver is integrated into the microcontroller unit, and a low dropout regulator (LDO) is further integrated into the microcontroller unit.

In an embodiment of the present disclosure, each of the plurality of linear constant current driver ICs includes a plurality of output channels correspondingly connected with a plurality of light emitting areas in an OLED panel.

In an embodiment of the present disclosure, a number of the plurality of linear constant current driver ICs multiplied by a number of the plurality of output channels on a a number of the OLED panels multiplied by a number of the plurality of light emitting areas on an OLED panel.

In an embodiment of the present disclosure, an over-temperature detecting circuit is disposed adjacent to the OLED panel light source, and is connected with the microcontroller unit for detecting a temperature of the OLED panel light source, and transmitting the detected temperature to the microcontroller unit.

In an embodiment of the present disclosure, the over-temperature detecting circuit includes a PCB circuit board; and a thermistor, a pull-up voltage dividing resistor, and an A/D sampling circuit disposed on the PCB circuit board. The thermistor is connected with the pull-up voltage dividing resistor, one end of the A/D sampling circuit is connected with a line between the thermistor and the pull-up voltage dividing resistor, and the other end of the A/D sampling circuit is connected with the A/D sampling port of the microcontroller unit.

In an embodiment of the present disclosure, a dynamic effect of the OLED light source is controlled by the differential bus; a differential bus protocol used by the differential bus includes a high-speed digital communication bus protocol based on a UART protocol combined with a local differential bus physical layer structure.

In an embodiment of the present disclosure, the first internal transceiver transmits a control signal with the second internal transceiver disposed in each of the plurality of linear constant current driver ICs, and the microcontroller unit transmits a control signal with the linear constant current module through the first internal transceiver.

In an embodiment of the present disclosure, a voltage of the OLED panel corresponding to the OLED light-emitting area on each channel of each of the plurality of linear constant current driver ICs is sampled through the differential bus communication line. When the voltage of the OLED panel rises within a preset range, the microcontroller unit outputs a feedback signal to adjust the output voltage of the DC/DC constant voltage module, so that each of the plurality of linear constant current driver ICs has a sufficient voltage for increasing the voltage of the OLED panel. When the voltage of the OLED panel rises beyond the preset range, the microcontroller unit outputs a feedback signal to increase the output voltage of the DC/DC constant voltage module to a preset limit voltage, to maintain a preset constant output limit power to drive the OLED panel light source.

The present disclosure further provides an OLED lamp, which uses the above OLED light source drive control circuit.

As described above, the OLED light source drive control circuit and the OLED lamp of the present disclosure have the following beneficial effects:

1. The present disclosure adopts a differential bus communication method, which is an optimized and improved high-speed digital communication bus protocol based on a UART protocol combined with a local differential bus physical layer structure. Compared with the traditional I2C or SPI communication line, the differential bus communication protocol and mode have a stronger anti-interference ability because a signal in the form similar to the "voltage difference" of two differential lines is used as the transmission signal. The anti-interference ability can bring convenience to the layout of the drive control circuit. The former I2C and SPI communication modes need to arrange the linear constant current module with a communication interface and the microcontroller unit on the same PCB board due to their weak anti-interference ability, to avoid the communication line being too long and introducing external interference. By using this differential bus communication protocol, the linear constant current module with communication interface and the microcontroller unit may be disposed on different PCB boards to facilitate the design and layout of the control circuit of some compact vehicle lamps.

2. The present disclosure uses a DC/DC constant voltage module to pre-process the vehicle body voltage, which effectively improves the circuit conversion efficiency of the entire drive system, reduces the power consumption and heat consumed by the driver, and can effectively reduce the size of the drive plate.

3. The present disclosure uses a circuit combining a front-end DC/DC constant voltage module and a back-end linear constant current module, which can effectively reduce the external radiation interference of the switching power supply type circuit, and can make the EMC electromagnetic compatibility test easier to pass.

4. The present disclosure uses a first internal transceiver and a linear constant current module with a second internal transceiver to communicate via a differential bus, which simplifies the control circuit framework and reduces the PCB occupation rate and reduces the required number of I/O ports or PWM ports of Microcontroller Unit (MCU).

5. In the present disclosure, when the OLED fails, an enable signal (EN) is used to turn off the DC/DC constant voltage module, which can reduce the OLED fault shutdown current and make it easier for the lamps to meet the current demand of the entire vehicle body BCM for fault diagnosis.

6. The present disclosure can prevent the OLED current from being reduced due to insufficient output voltage (insufficient voltage difference) originally set for the back-end linear constant current driver after the voltage of the OLED panel increases due to aging problems, thereby maintaining a constant luminous flux output of the OLED. The OLED light source can be driven by maintaining a preset constant output limit power to avoid excessive overheating of the entire lamp system.

7. The present disclosure can reduce the current flowing through the OLED or turn off the OLED light source to avoid damage to the OLED by high temperature.

8. The present disclosure can achieve the independent control of multiple OLED light source light emitting areas or multiple LED light sources through a simple control circuit framework, and achieve functions such as various dynamic effects and text information display.

BRIEF DESCRIPTION OF THE DRAWINGS

To more clearly illustrate the technical solutions in the embodiments of the present disclosure, the drawings used in the description of the embodiments will be briefly described below. The drawings in the following description are only some embodiments of the present disclosure. Other drawings may also be obtained by those skilled in the art without creative work.

FIG. 13-1 and FIG. 13-2 are respectively schematic views showing the entire structure of the OLED light source drive control circuit when an LED light source is used according to the present disclosure.

DESCRIPTION OF COMPONENT MARK NUMBERS

Figure 1:
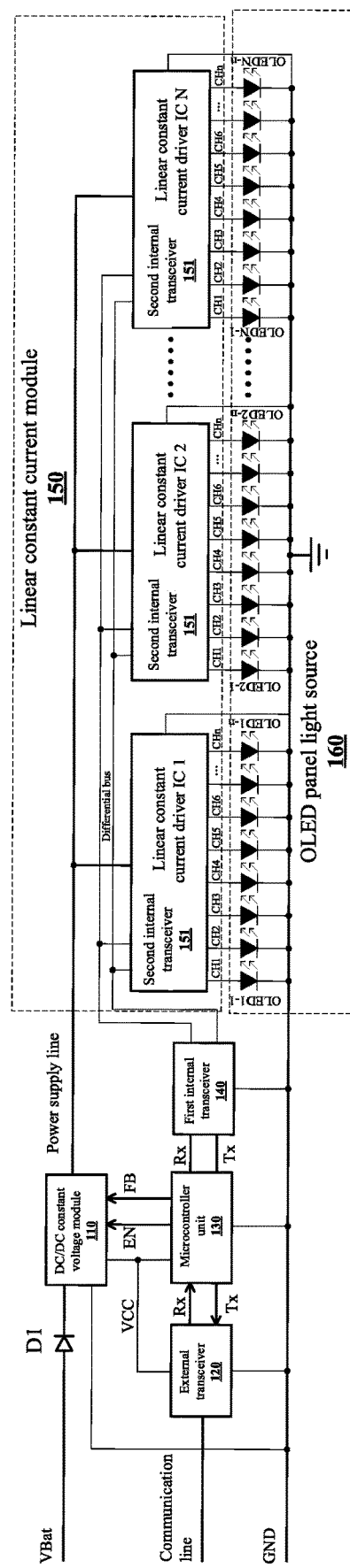
FIG. 1 is a schematic view showing the principle structure of an OLED light source drive control circuit according to the present disclosure.

110 DC/DC constant voltage module
120 External transceiver
121 LIN transceiver
122 CAN transceiver
130 Microcontroller unit
140 First internal transceiver
150 Linear constant current module
151 Second internal transceiver
160 OLED panel light source
170 Over-temperature detecting circuit
171 PCB circuit board
172 A/D sampling circuit
180 Lamp control module
190 LED light source

DETAILED DESCRIPTION OF THE PREFERRED EMBODIMENTS

The embodiments of the present disclosure will be described below through specific embodiments. Those skilled in the art can easily understand other advantages and effects of the present disclosure according to contents disclosed by the specification. The present disclosure can also be implemented or applied through other different specific implementation modes. Various modifications or changes can also be made to all details in the specification based on different points of view and applications without departing from the spirit of the present disclosure. It needs to be stated that the following embodiments and the features in the embodiments can be combined under the situation of no conflict.

Referring to FIGS. 1 to 13. It should be understood that the structures, proportions, sizes, and the like, which are illustrated in the drawings of the present specification, are only used to clarify the contents disclosed in the specification for understanding and reading by those skilled, and are not intended to limit the implementation of the present disclosure, thus are not technically meaningful. Any modification of the structure, change of the scale, or adjustment of the size should still fall within the scope of the technical contents disclosed by the present disclosure without affecting the effects and achievable objectives of the present disclosure. In the meantime, the terms "upper", "lower", "left", "right", "intermediate" and "one" as used in this specification are also for the convenience of description, and are not intended to limit the scope of the present disclosure, and the change or adjustment of the relative relationship is considered to be within the scope of the present disclosure without substantial changes in technology.

The present embodiment provides an OLED light source drive control circuit and an OLED lamp, which can be widely used in the electronic power supply drive and control system of the vehicle OLED lamp, and can improve problems that the linear drive system of the former OLED lamp generates a large amount of heat, the required area of the control board is large, and the EMC anti-interference ability is poor. At the same time, light emitting areas of multiple blocks in the complex multi-piece OLED light source in the OLED vehicle lamp are independently controlled to achieve the dynamic OLED display effect, which can simplify the control system in the OLED lamp, simplify the connecting wiring harness of the control loop, and facilitate the cascade expansion. For the increase of the independently controllable OLED light emitting areas, the number of back-end OLED linear constant current driver ICs can be directly cascaded to expand without changing the model in the selection of the microcontroller, which is conducive to the platformization of the OLED control part.

The present disclosure solves the shortcomings of the traditional vehicle OLED lamp drive circuit using a single type of linear drive circuit. When a single linear constant current driver is used, the drive circuit has low working efficiency, excessive heat, too large drive control board area, and poor anti-interference ability. To improve the drive conversion efficiency and reduce the ambient temperature in the whole lamp, a new circuit framework using a DC/DC constant voltage mode at the front end and linear driver at the back end is applied. The circuit uses the DC/DC constant voltage mode at the front end, and the output voltage is controlled at a value slightly higher than the voltage of OLED. The power is supplied to the linear driver of the multi-channel back end, to improve the working efficiency of the entire system drive circuit and reduce the heat generated by the OLED driver.

The principle and embodiments of the OLED light source drive control circuit and the OLED lamp of the present disclosure will be described in detail below, so that those skilled in the art can understand the OLED light source drive control circuit and the OLED lamp of the present disclosure without any creative work.

The present disclosure provides an OLED light source drive control circuit according to an embodiment. The OLED light source drive control circuit includes a DC/DC constant voltage module 110, an external transceiver 120, a first internal transceiver 140, a microcontroller unit 130, a linear constant current module 150 and an OLED panel light source 160.

In the present embodiment, the DC/DC constant voltage module 110 is connected with the positive pole of a vehicle power line, and outputs power to the external transceiver 120, the first internal transceiver 140, the microcontroller unit 130 and the linear constant current module 150, respectively.

The DC/DC constant voltage module 110 not only outputs power to the linear constant current module 150, but also outputs power VCC to the external transceiver 120, the microcontroller unit 130 and the first internal transceiver 140.

In the present embodiment, the interface between the vehicle body and the OLED vehicle lamp is a power line VBat, a ground line GND, a LIN communication line or two CAN communication lines (CANH line and CANL line).

In the present embodiment, an anti-reverse circuit is connected with a line between the DC/DC constant voltage module 110 and the vehicle power line.

The anti-reverse circuit includes but is not limited to an anti-reverse diode or an anti-reverse PMOS circuit. For example, the anti-reverse circuit uses an anti-reverse diode D1, one end of the anti-reverse diode D1 is connected with the power line VBat, and the other end of the anti-reverse diode D1 is connected with the input end of the DC/DC constant voltage module 110.

In the present embodiment, one end of the external transceiver 120 is connected with a vehicle communication line, and the other end of the external transceiver 120 is connected with the microcontroller unit 130. The external transceiver 120 receives a control signal transmitted by the vehicle communication line and transmits the control signal to the microcontroller unit 130 for the microcontroller unit 130 to execute a control instruction corresponding to the control signal.

The external transceiver 120 communicates with the microcontroller unit 130 (MCU) through the Rx communication port and the Tx communication port.

Figure 2:
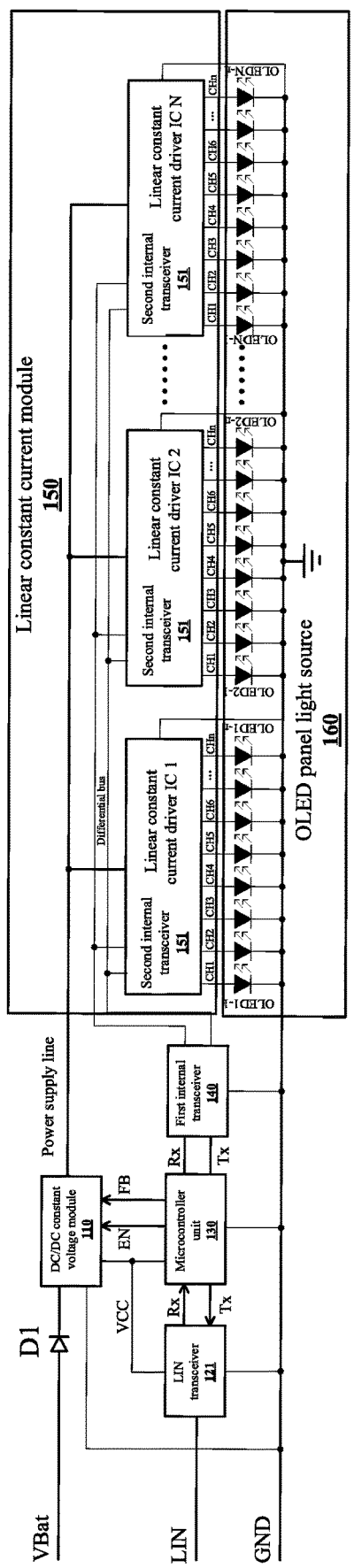
FIG. 2 is a schematic view showing the structure of a specific circuit using LIN communication in the OLED light source drive control circuit according to the present disclosure.
Figure 3:
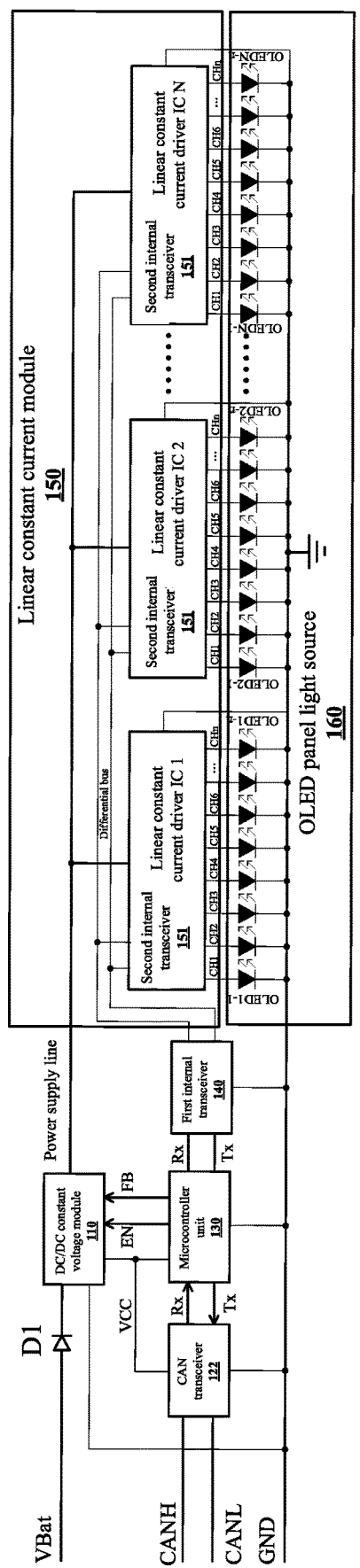
FIG. 3 is a schematic view showing the structure of a specific circuit using CAN communication in the OLED light source drive control circuit according to the present disclosure.

Specifically, in the present embodiment, as shown in FIG. 2, the external transceiver 120 is a LIN transceiver 121, the vehicle communication line includes a LIN communication line, and the communication between the OLED lamp and the vehicle body follows the LIN communication protocol. Or as shown in FIG. 3, the external transceiver 120 is a CAN transceiver 122, and the vehicle communication line includes CAN communication lines (CANH line and CANL line), and the communication between the OLED lamp and the vehicle body follows the CAN communication protocol.

In the present embodiment, the microcontroller unit 130 communicates with the first internal transceiver 140, detects an output voltage of the linear constant current module 150, feeds back the detected output voltage to the DC/DC constant voltage module 110 for the DC/DC constant voltage module 110 to adjust the output voltage output to the linear constant current module 150, and controls the DC/DC constant voltage module 110 to operate according to the detected output voltage or a voltage fed back by the linear constant current module 150.

Specifically, the microcontroller unit 130 performs algorithm processing according to the detected output voltage of each channel of the linear constant current module 150, selects the highest voltage UOUT(max) among the multiple output channels, then sets the feedback signal (FB) according to the highest voltage, outputs the feedback to the DC/DC constant voltage module 110 for the DC/DC constant voltage module 110 to adjust the output voltage output to the linear constant current module 150, and controls the DC/DC constant voltage module 110 to operate according to the detected output voltage of the linear constant current module 150. The form of the feedback signal FB may include an analog voltage value, a PWM signal and so on.

Figure 4:
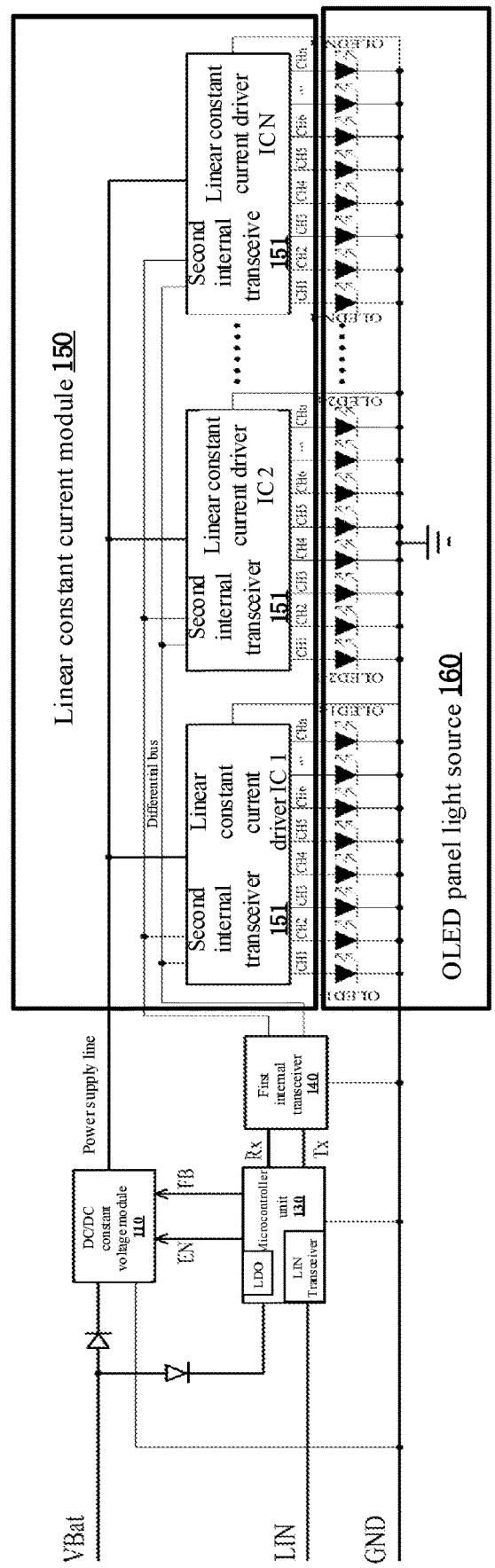
FIGS. 4 to 7 are schematic views showing another circuit structure having the same effect of the OLED light source drive control circuit according to the present disclosure.
Figure 5:
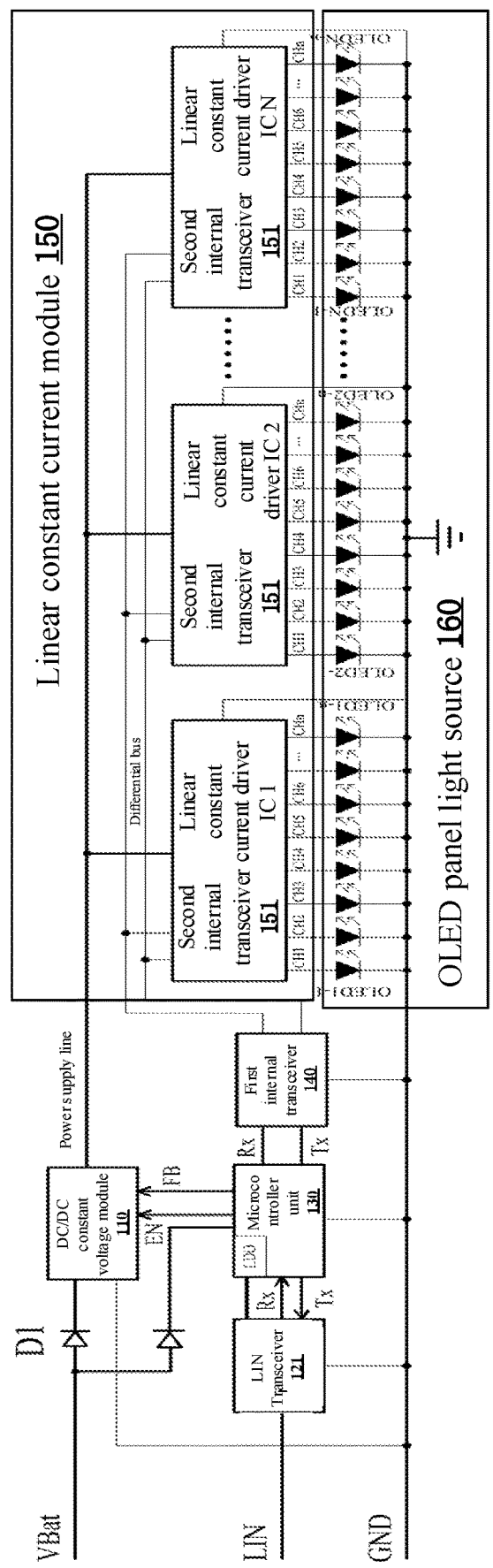

In the present embodiment, as shown in FIG. 4 and FIG. 5, the external transceiver 120 can be integrated into the microcontroller unit 130, and a low dropout regulator (LDO) is also integrated into the microcontroller unit 130. When the transceiver is integrated into the microcontroller unit 130, the anti-reverse diode D2 for performing anti-reverse protection is added to form an anti-reverse circuit for the anti-reverse protection of the microcontroller unit 130.

Figure 6:
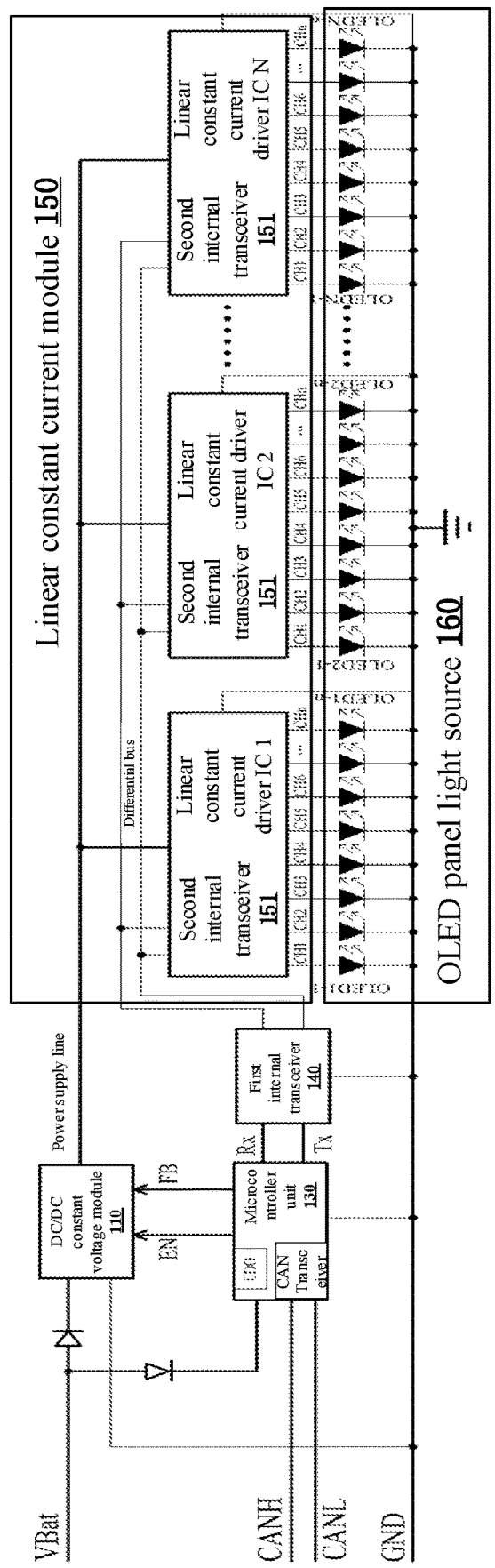
Figure 7:
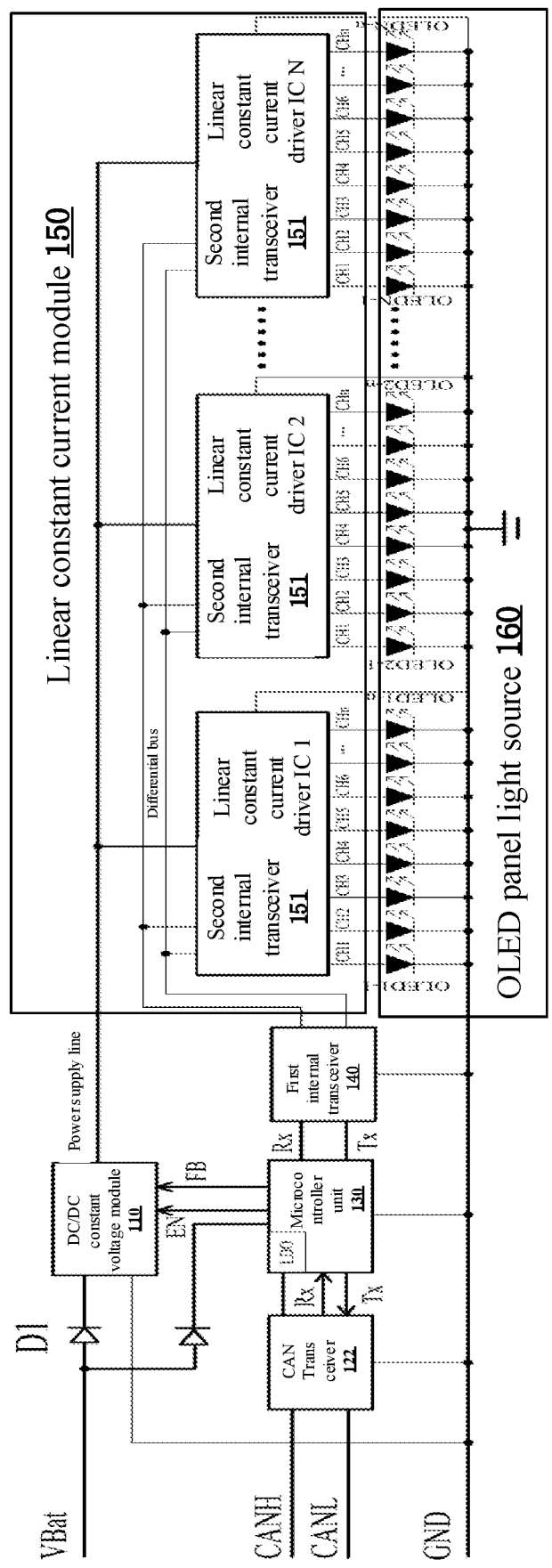

As shown in FIG. 6 and FIG. 7, the microcontroller unit 130 may only integrate the LDO, and the external transceiver 120 is connected with the exterior of the microcontroller unit 130.

In the present embodiment, the first internal transceiver 140 is connected with the linear constant current module 150 through a differential bus for transmitting signals between the microcontroller unit 130 and the linear constant current module 150. The first internal transceiver 140 is an internal CAN transceiver.

The dynamic effect of the OLED light source is controlled by the differential bus. The differential bus protocol used by the differential bus is a high-speed digital communication bus protocol based on a UART protocol combined with the local differential bus physical layer structure.

The microprocessor module 130 communicates with the first internal transceiver 140 through Rx and Tx communication ports. The first internal transceiver 140 is connected with the communication ports of the linear constant current driver ICs in the back-end linear constant current module 150 through the differential bus, to control the switching, dimming, and delay of each channel OLED light source.

The microcontroller unit 130 can output a feedback signal (FB) to the DC/DC constant voltage module for timely adjusting the output voltage of the DC/DC constant voltage module 110, and the microcontroller unit 130 can output the enable signal (EN) to the DC/DC constant module 110 to stop the operation of the DC/DC constant voltage module 110.

In the present embodiment, the linear constant current module 150 includes a plurality of linear constant current driver ICs. Each contains a second internal transceiver 151. The differential bus interface of the second internal transceiver 151 is respectively connected with the differential bus communication line connecting with the differential bus interface of the first internal transceiver 140, to communicate with the differential bus interface of the first internal transceiver 140.

The first internal transceiver 140 transmits control signals with the second internal transceiver 151 disposed in each. The microcontroller unit 130 transmits control signals with the linear constant current module 150 through the first internal transceiver 140.

The second internal transceiver 151 may also be an internal CAN transceiver.

Therefore, the OLED light source drive control circuit in the present embodiment uses the DC/DC constant voltage circuit as a front-end first stage circuit. The input voltage is firstly adjusted to a range suitable for the back-end OLED voltage through a high-efficiency drive method. For example, 12V is reduced to 6V, the conversion efficiency is about 80% through the DC/DC drive, which is much higher than the simple linear constant current conversion efficiency of 30%. Then in the second stage, the linear constant current driver ICs are connected for precisely controlling the current flowing through the OLED. From the perspective of the drive system, it effectively improves the circuit conversion efficiency of the entire drive system, reduces the power consumption and heat generated by the driver, and can effectively reduce the area of the drive board. Moreover, due to the use of a hybrid circuit of the front-end DC/DC constant voltage driver and the back-end linear constant current driver, the back-end second stage linear constant current module can effectively relieve the external radiation interference of the previous stage DC/DC constant voltage circuit. Compared with the traditional DC/DC constant current drive, it can effectively reduce the external radiation interference of the switching power supply circuit, and makes it easier to pass the external radiation and external conduction test in the EMC test.

As the tail light source, the purpose of OLED is to show the sense of science and technology and super cool, and achieve a single OLED graphics area individually controlled separately lighting. When the number of OLED is large, it will bring the burden of the requirement of the microcontroller pins. The first-generation driver uses a serial-to-parallel output shift register chip to achieve one SPI communication converting to several parallel output controls to expand the number of I/O ports. This control framework requires additional multiple shift register ICs and peripheral circuits in addition to the linear constant current driver, which increases the complexity of the control circuit and the occupation area of the board. The OLED light source drive control circuit in the present embodiment uses linear constant current driver ICs with a communication function, uses a differential bus communication protocol provided by the linear constant current driver ICs to communicate with the microcontroller unit 130 through the first internal transceiver 140 (internal CAN transceiver), achieves diversified OLED graphic display effects through a few simple communication lines, and simplifies the control circuit framework, thereby reducing the PCB occupation rate and saving the required number of I/O ports or PWM ports of MCU. Meanwhile, compared to the communication line method using I2C or SPI lines, the differential bus protocol is an optimized and improved high-speed digital communication bus protocol based on the UART protocol combined with the local differential bus physical layer structure. It has the characteristics of strong anti-electromagnetic interference capability. It is particularly beneficial to OLED vehicle lamps, which are dynamic control systems that need to independently control each light-emitting area. The strong anti-interference ability is beneficial for OLED vehicle lamps to implement the preset dynamic effects and achieve various dynamic effects and text information display.

Therefore, it can be seen that the original OLED drive control system uses a serial-to-parallel output shift register chip to achieve one SPI communication converting to several parallel output controls to expand the number of I/O ports. This control framework needs additional multiple shift register ICs and peripheral circuits in addition to the linear constant current driver, which increases the complexity of the control circuit and the occupation area of the board. The OLED light source drive control circuit in the present embodiment uses linear constant current driver ICs with a communication function, uses a differential bus communication port of the linear constant current driver IC to transmit control signals with the internal CAN transceiver. The control signals are converted by the internal CAN transceiver to communicate with the microcontroller unit 130. Diversified OLED graphic display effects are achieved through a few simple communication lines, and the control circuit framework is simplified, thereby reducing the PCB occupation rate and saving the number of I/O ports or PWM ports required by the microcontroller unit 130. The differential bus communication method has a stronger anti-interference ability than the traditional I2C or SPI communication line. Meanwhile, the open circuit or short circuit fault of the OLED load can be fed back to the microcontroller unit 130 through the communication interface of the internal CAN transceiver through the differential bus communication port of the linear constant current driver IC. Then the microcontroller unit 130 outputs enable (EN) signals to switch off the DC/DC constant voltage module 110 of the previous stage, thereby reducing the OLED fault shutdown current, and making it easier for the lamp to meet the current requirements of the vehicle body BCM for fault diagnosis.

In the present embodiment, each in the linear constant current module 150 has 1 to n output channels (for example, n=12) for connecting with the positive pole of the OLED light source, and the negative pole of the OLED light source is connected with GND (the OLED source is a shared cathode, and the required must be a high side driver). The linear constant current driver ICs 1 to N can all be hung on the differential bus communication line (the differential bus protocol is an optimized and improved high-speed digital communication bus protocol based on the UART protocol combined with the local differential bus physical layer structure), and cascaded in this way to expand the number of channels for controlling the OLED light source (the number of individually controllable light emitting areas of the OLED according to actual needs). The collects the voltage value of the OLED light source of each channel, and transmits the voltage value to the first internal transceiver 140 through the second internal transceiver and the differential bus communication line. Then the first internal transceiver 140 converts the signal to the microcontroller unit 130. When an abnormal voltage is detected, it can be determined that the OLED has a short circuit or open circuit. The microcontroller unit 130 can output an EN signal to switch off the front-end DC/DC constant voltage module 110 to stop supplying power to the back-end linear constant current module 150. On the other hand, the microcontroller unit 130 may also collect the voltage value of the OLED light source through the differential bus communication line. When the voltage of OLED changes within a certain range (not short circuit or open circuit), the MCU can output a feedback (FB) signal to the DC/DC constant voltage module 110, to adapt to the voltage change caused by the aging of the back-end OLED by adjusting the output voltage value of the DC/DC constant voltage module 110, and to compensate for the darkening or brightening of the OLED due to aging.

In the present embodiment, the OLED panel light source 160 includes a plurality of OLED panels corresponding to the linear constant current driver ICs respectively, each of the plurality of OLED panels is controlled to emit light by an output channel of the.

In the present embodiment, each includes a plurality of output channels correspondingly connected with a plurality of light emitting areas in an OLED panel.

The output ends of the linear constant current driver ICs are respectively connected with the positive poles extracting from the light emitting areas of the OLED according to the number of channels (CH1 to CHn), and the negative poles extracting from the light emitting areas of the OLED are all connected with the ground (GND).

In the present embodiment, the voltage value of the OLED panel corresponding to the OLED light emitting area on each channel of each is collected by the differential bus communication line. When the voltage of the OLED panel rises within a preset range, the microcontroller unit 130 outputs a feedback signal to adjust the output voltage of the DC/DC constant voltage module 110, so that each has a sufficient voltage for increasing the voltage of the OLED panel. When the voltage of the OLED panel rises beyond the preset range, the microcontroller unit 130 outputs a feedback signal to increase the output voltage of the DC/DC constant voltage module 110 to a preset limit voltage, to maintain a preset constant output limit power to drive the OLED panel light source.

Specifically, to adapt to changes in the electrical characteristics of the panel after aging of the OLED panel due to high temperature and the solar radiation, and to prevent the OLED lamp from darkening due to environmental factors, the OLED light source drive control circuit in the present embodiment is designed as follows: the microcontroller unit 130 of the OLED light source drive control circuit in the present embodiment is connected with the first internal transceiver 140 (internal CAN transceiver). The first internal transceiver 140 is connected with the communication port of each. The microcontroller unit 130 converts signals through the first internal transceiver 140 (internal CAN transceiver), and collects the OLED panel voltage corresponding to the OLED light emitting areas on each channel of the through the differential bus communication line (the differential bus protocol is an optimized and improved high-speed digital communication bus protocol based on the UART protocol combined with the local differential bus physical layer structure). When the voltage of the OLED panel rises within a certain range (it can be customized, for example, +30%), the microcontroller unit 130 outputs a feedback signal to adjust the output voltage of the front-end DC/DC constant voltage module 110 (follow-up voltage control), so that the back-end linear constant current module 150 has enough voltage for the OLED with rising panel voltage to maintain the original current value to emit light, which prevents the OLED current from being reduced due to insufficient preset output voltage (insufficient voltage difference) for the back-end linear constant current driver after the voltage rises due to the aging problem of the panel, thereby maintaining a constant luminous flux output of the OLED, that is, preventing darkening of the entire lamp after the electrical characteristics of the OLED panel change due to environmental factors. When the voltage of the OLED panel rises beyond the preset range, the microcontroller unit 130 outputs a feedback signal to adjust the drive output of the front-end DC/DC constant voltage module, so that the front-end DC/DC constant voltage module of the OLED can output a voltage that rises to a set ratio to the limit, to maintain a preset constant output limit power to drive the OLED light source, thereby avoiding excessive overheating of the entire lamp system.

If the OLED light source participates in the assessment of the light distribution regulation of the entire lamp, such as the damage of a single light emitting area in the OLED light source, it may affect the compliance of the light distribution of the whole lamp. At this time, it is necessary for the single light emitting area having damages to turn off all the OLED panels to display the damaged functions of the lamp. The conventional OLED drive control circuit does not have this fault shutdown function. In the OLED light source drive control circuit of the present embodiment, the voltage of the output end of each channel of each for supplying power to the OLED is transmitted back to the internal CAN transceiver through the differential bus communication interface of the. Then the internal CAN transceiver converts signals to the microcontroller unit 130. If the voltage change has the characteristics of an OLED short circuit or open circuit, it can be detected by the microcontroller unit 130. Then the microcontroller unit 130 outputs an enable (EN) signal to the front-end DC/DC constant voltage module 110 for shutting down the operation of the DC/DC constant voltage module 110, and stops the power supply to the back-end linear constant current module 150 to turn off all the OLEDs, and the fault alarm signal provided by the microcontroller unit 130 (MCU) is transmitted to the vehicle body through the CAN/LIN communication line.

In the present embodiment, a number of the linear constant current driver ICs multiplied by a number of the output channels on a a number of the OLED panels multiplied by a number of the light emitting areas on an OLED panel.

Figure 8:
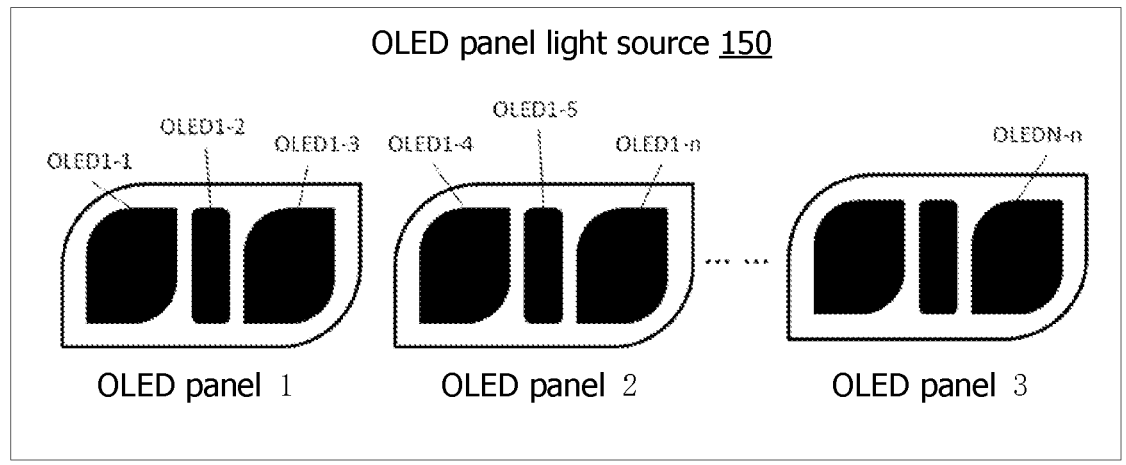
FIG. 8 is a schematic view showing a layout of the OLED panel in the OLED light source drive control circuit according to the present disclosure.

Specifically, FIG. 8 is a schematic view for explaining the OLED panel and the light emitting area corresponding to the OLED light source in the OLED light source drive control circuit of the present embodiment (but is not limited to this figure, and this figure is only an example). Assume that a lamp has M OLED panels as shown in FIG. 8, and each OLED panel has m independently controllable light emitting areas (where m=3 in FIG. 8, that is, each OLED panel has three independently controllable light emitting areas), OLED1-1 represents the leftmost light emitting area of the first OLED panel, OLED1-2 represents the middle light emitting area of the first OLED panel, and OLED1-3 represents the rightmost light emitting area of the first OLED. Certainly, m may be greater than 3, so each OLED panel may have m independent light emitting areas greater than 3. It should be noted that N represents N linear constant current driver ICs, and n represents the number of output channels in each. The relationship is Nxn Mxm, that is, the total number of output channels of the group must be greater than or equal to the light emitting areas of all the OLED panels required to be controlled independently.

Figure 9:
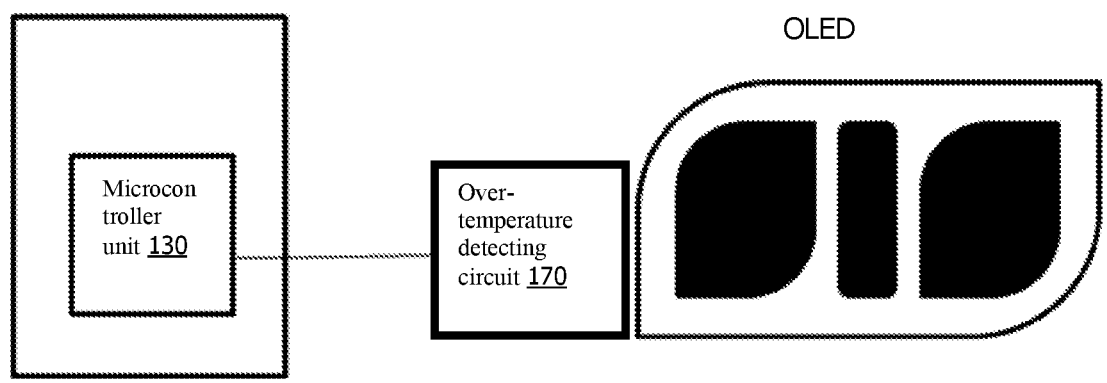
FIG. 9 is a schematic view showing the connection of an over-temperature detecting circuit in the OLED light source drive control circuit according to the present disclosure.

In the present embodiment, as shown in FIG. 9, an over-temperature detecting circuit 170 is disposed in the OLED panel light source 160, and is connected with the microcontroller unit 130 for detecting a temperature of the OLED panel light source 160, and transmitting the detected temperature to the microcontroller unit 130.

The over-temperature detecting circuit 170 is disposed on the most heated area inside the lamp. The temperature change in the lamp is transmitted to the microcontroller unit 130 through the over-temperature detecting circuit 170. The microcontroller unit 130 can timely adjust the output control strategy to reduce the current flowing through the OLED light source or turn off the OLED light source to prevent damage to the OLED light source by high temperature.

Figure 10:
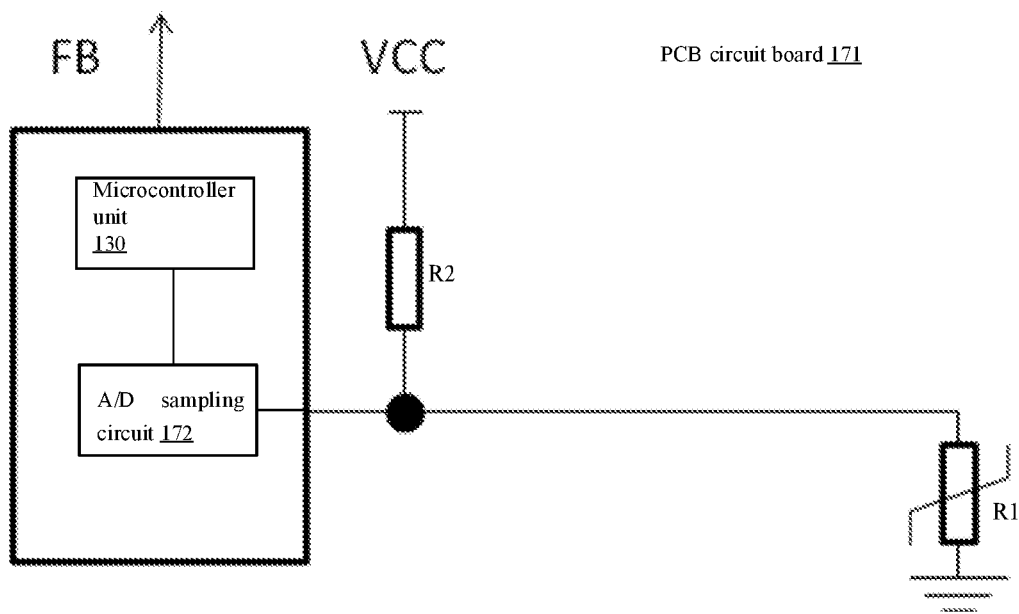
FIG. 10 is a schematic view showing the circuit structure of the over-temperature detecting circuit in the OLED light source drive control circuit according to the present disclosure.

Specifically, as shown in FIG. 10, in the present embodiment, the over-temperature detecting circuit 170 includes a PCB circuit board 171; and a thermistor, a pull-up voltage dividing resistor, and an A/D sampling circuit 172 disposed on the PCB circuit board 171. The thermistor is connected with the pull-up voltage dividing resistor, one end of the A/D sampling circuit 172 is connected with a line between the thermistor and the pull-up voltage dividing resistor, and the other end of the A/D sampling circuit 172 is connected with the microcontroller unit 130.

In the present embodiment, the principle of over-temperature protection is as follows:

The thermistor is welded on a PCB board and has polarized lead-out leads. The PCB is disposed physically close to the OLED panel and fixed for sensing the temperature near the OLED. In the circuit structure, the over-temperature detecting circuit 170 includes a pull-up voltage dividing resistor, a thermistor and an A/D sampling circuit 172. The pull-up voltage dividing resistor is pulled up to a constant voltage VCC, and the lower end of the pull-up voltage dividing resistor is connected with the thermistor. The other end of the thermal circuit is connected with the ground GND. The voltage of the connection point, i.e. the voltage dividing point, between the thermistor and the pull-up resistor is taken a sample to the microcontroller unit 130 (MCU) by the A/D sampling circuit 172 of the microcontroller unit 130 (MCU). When the thermistor changes the resistance value due to temperature changes, the microcontroller unit 130 (MCU) can sense it through the voltage change of the voltage dividing point, so that the microcontroller unit 130 (MCU) outputs the feedback (FB) signal (it may be 0% to 100% of the PWM signal) to the front-end DC/DC constant voltage module 110, and adjusts timely to reduce the current flowing through the OLED source or directly turn off the OLED source.

The ground ends of the DC/DC constant voltage module 110, the external transceiver 120, the first internal transceiver 140, the microcontroller unit 130, the linear constant current module 150, and the OLED panel light source 160 are respectively connected with a negative pole of the vehicle power line.

In the present embodiment, the working principle of the OLED light source drive control circuit is as follows:

There are two kinds of signals inputting into the OLED light source drive control circuit from the vehicle body. One is the power line of VBat and GND, VBat is the positive pole of the power line, and GND is the negative pole of the power line. The positive and negative poles form the current loop of the drive control circuit of the entire OLED light source, and are responsible for the power supply of the entire OLED light source drive control circuit. The other is the communication signal line LIN (one LIN line input) or CAN (divided into CANH and CANL two line inputs), which is responsible for control functions of the OLED light source drive control circuit, for example, whether the vehicle body needs to turn on the power supply of the OLED through the LIN or CAN communication line, or the vehicle body inputs a preset signal through LIN or CAN, and different light emitting areas of the OLED respectively perform the dynamic display according to a certain dynamic effect, to represent a special scene definition of the vehicle body (such as "welcome mode", when the vehicle key is approaching, the OLED tail light will greet the vehicle owner with a certain preset dynamic effect).

The anti-reverse circuit provides an anti-reverse connection for the entire OLED light source drive control circuit, and may include a diode or a PMOS anti-reverse circuit with the same effect, and is used to prevent damage to the system when the positive and negative poles of the power supply are reversely arranged. The DC/DC constant voltage module 110 may be, for example, a DC/DC and E522.10 chip type in the buck form, or a SEPIC and ZETA constant voltage circuit in the buck-boost form or a DC/DC chip with other similar functions.

Figure 11:
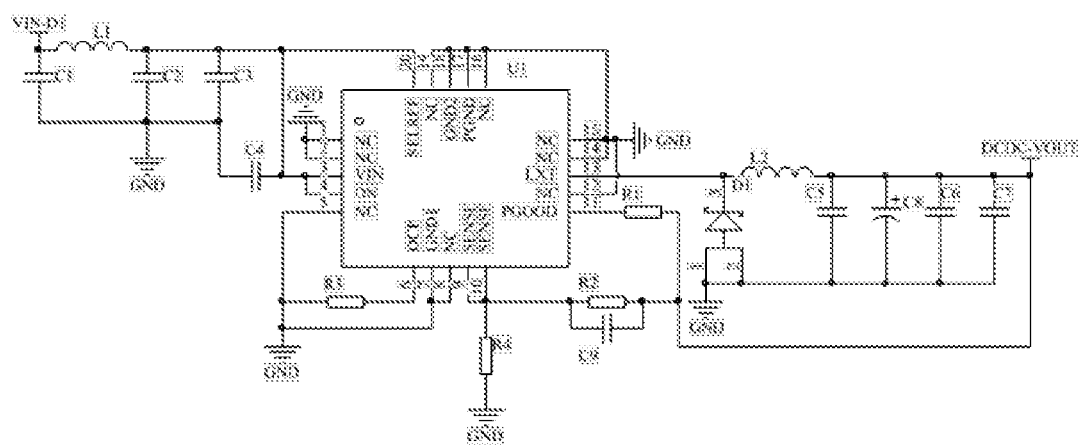
FIG. 11 is a schematic view showing a DC/DC constant voltage module in the OLED light source drive control circuit according to the present disclosure.

FIG. 11 shows a schematic view of the DC/DC constant voltage module 110. The DC/DC constant voltage module 110 may be composed of an input filter circuit, a DC/DC drive chip (taking ELMOS manufacturer's E522.10 as an example), a peripheral circuit (see the example circuit structure of the DC/DC constant voltage module 110 in FIG. 11 for details) forming the constant voltage topology framework (buck topology or SEPIC buck-boost topology or ZETA buck-boost topology), and an output filter circuit. The input filter circuit mitigates the ripple of the DC/DC switching power supply circuit. FIG. 11 is a DC/DC buck constant voltage circuit (FIG. 11 is an example of this type, however, it is not limited to this buck type, and may be extended to a SEPIC or ZETA type constant voltage circuit in the form of buck-boost). In FIG. 11, C1, L1, and C2 constitute an input filter circuit; U1, D1, L2, and C5 constitute DC/DC buck topology structure; C8, C6, and C7 constitute the output filter circuit; and the remaining components in FIG. 11 constitute the peripheral circuit of the DC/DC constant voltage BUCK circuit. The D1 negative pole in the OLED light source drive control circuit is connected with the VIN-D1 port in FIG. 11. The power output of the DC/DC constant voltage output module in the OLED light source drive control circuit is the DC/DC-VOUT port in FIG. 11, and this port is connected with the power input end of the back-end group. The DC/DC constant voltage module 110 outputs a constant voltage to the power input end of the back-end linear constant current module 150. The voltage applied on two ends of the second stage group can be reduced through the first stage constant voltage at the front end. The power consumption on the second stage is reduced. The efficiency of the entire drive control system is improved by the front-end DC/DC+back-end linear circuit framework, the heat generated by the power consumption is reduced, and the size of the PCB board is reduced.

The communication signals of the internal transceiver of each (taking the TPS929XX series from TI as an example) in the linear constant current module 150 is connected with the communication port of the first internal transceiver 140 (internal CAN transceiver) through the differential bus (ICANH and ICANEL lines) to transmit control signals. The input signal port of the first internal transceiver 140 is connected with the communication port of the microcontroller unit 130 to receive the control signals transmitted from the microcontroller unit 130, so that the microcontroller unit 130 can convert signals through the internal CAN transceiver, and then independently controls the power supply output channel of each through instructions output by the differential bus. The control method includes: switching each channel and each channel's individual dimming, switching, and delay or time interval control. Each has n power supply output channels CH1~n, and each output channel is connected with the positive pole led by an OLED independently controlled light emitting area, to provide a constant current for the OLED to emit light. The negative poles of all the OLED independent light emitting areas are connected with the ground GND. The DC/DC constant current module 110 may further provide a constant voltage VCC power supply to the microcontroller unit 130 and the LIN transceiver 121. The LIN transceiver 121 receives the communication signal LIN of the vehicle body, and transmits the vehicle body instruction to the microcontroller unit 130 through the LIN transceiver 121. The microcontroller unit 130 receives the signal instruction and converts the signal through the internal CAN transceiver 122, and then transmits the control signal to each back-end linear constant driver IC through the differential bus, thereby achieving the independent control of each channel, that is, the independent control of each light emitting area.

Besides, the microcontroller unit 130 collects the voltage value output by each channel of each through the internal CAN transceiver via a differential bus. When the voltage value is abnormal, such as an open or short circuit of the OLED, the microcontroller unit 130 can collect the abnormal value and correspondingly output the enable (EN) signal to turn off the operation of the front-end DC/DC constant voltage module 110. When the voltage value collected by the microcontroller unit 130 through the internal CAN transceiver via the differential bus increases or decreases within a certain preset value range, the microcontroller unit 130 can output a feedback (FB) signal to the DC/DC constant voltage module 110 to adjust the voltage, thereby compensating for the increasing or decreasing current of the OLED due to the changes of panel voltage caused by the aging of the OLED.

Figure 12:
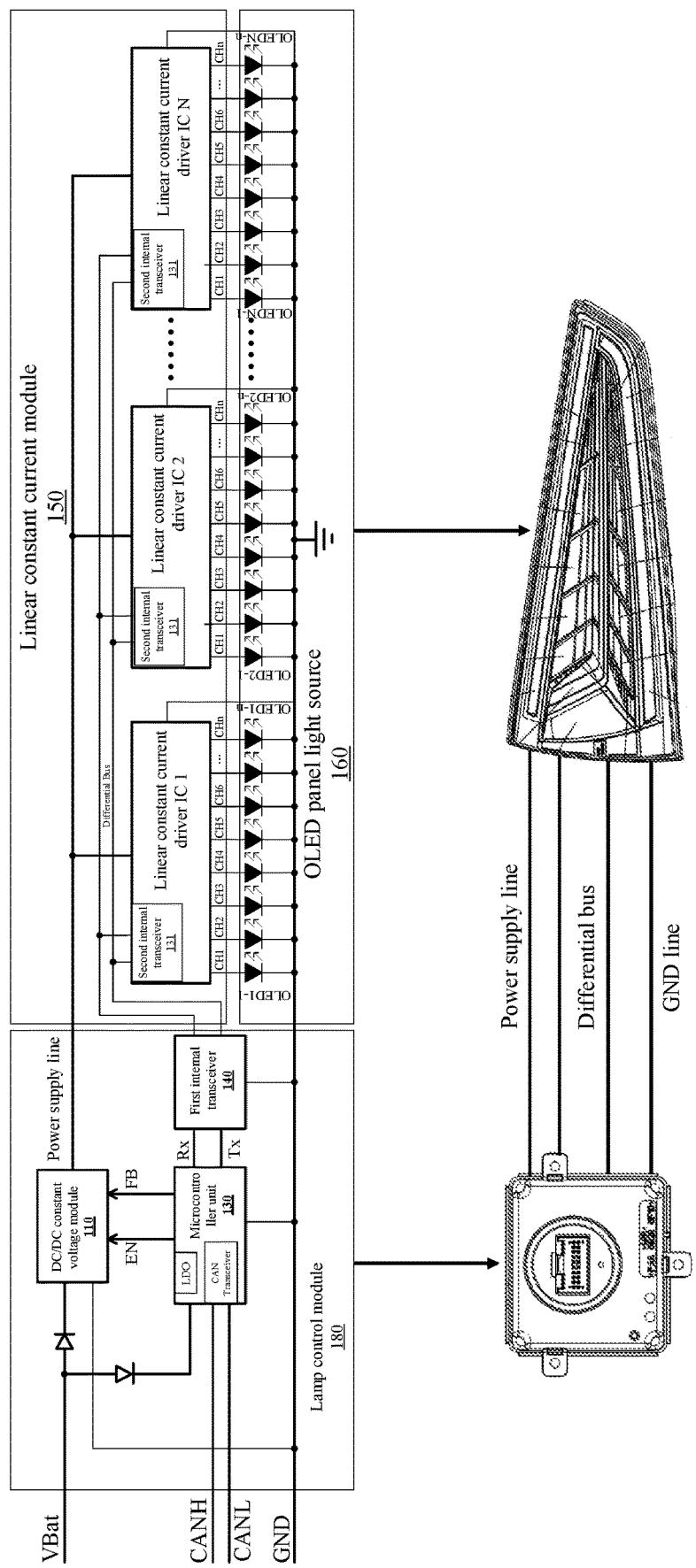
FIG. 12 is a schematic view showing a hardware application of the OLED light source drive control circuit according to the present disclosure.

As shown in FIG. 12, the present embodiment uses a front-end DC/DC constant voltage module for voltage pretreatment and a differential bus with the strong anti-interference ability for control signal transmission. The OLED light source drive control circuit framework of the present embodiment can combine several functional module circuits including the anti-reverse diode D1, the DC/DC constant voltage module 110, the external transceiver 120, the microcontroller unit 130, and the first internal transceiver 140 into a lamp control module 180. The lamp control module 180 may be designed as a standardized, platformizated and independent control module to separate the lamp control module 180 from the OLED light source drive control circuit framework and become a physically independent control module. The hardware circuit design of the lamp control module 180 may be applied to different vehicle lamps, and different software may be written into the control module for different lighting control effects. The lamp control module 180 can be disposed outside the vehicle lamp as a standard master module, while the linear constant current module 150 and the OLED panel light source 160 in the OLED light source drive control circuit framework in the present embodiment can be independently disposed in the lamp. The linear constant current module 150 acts as a slave drive circuit, and different circuit designs are made for different lamp shapes.

Figures 1, 13:
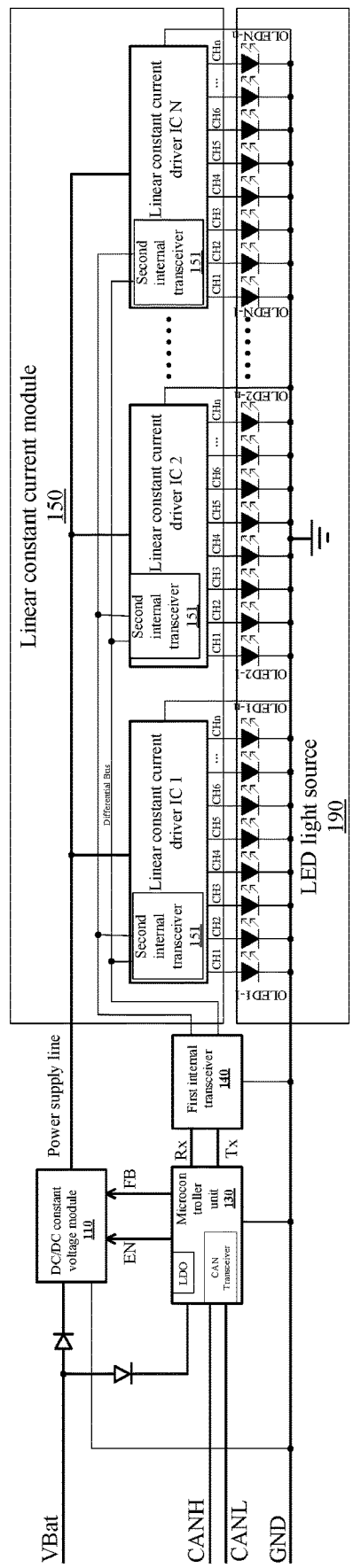
Figures 2, 13:
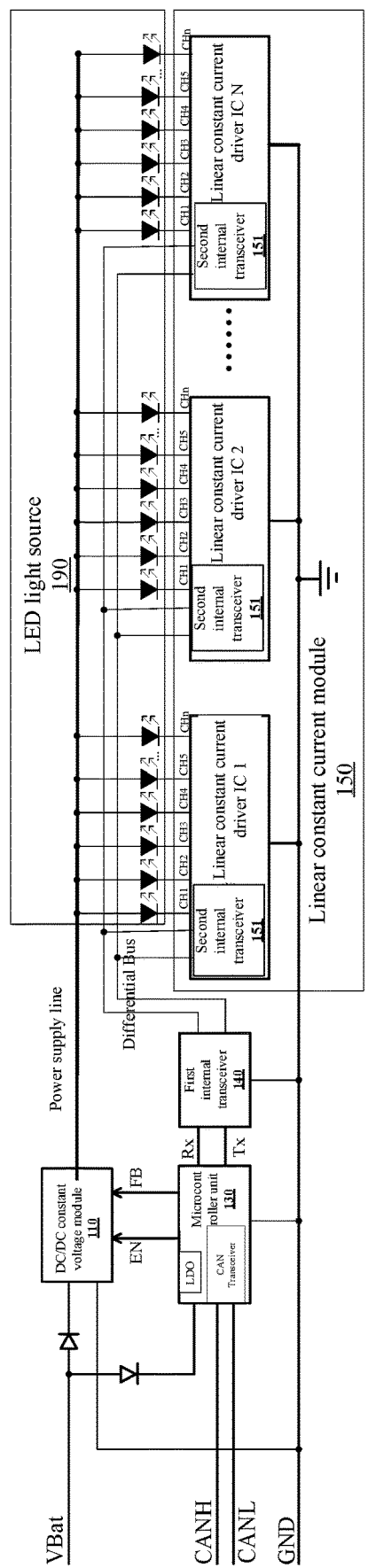

Besides, it should be noted that, as shown in FIG. 13-1 and FIG. 13-2, the above-mentioned OLED light source drive control circuit is also applicable to the LED light source 190. For example, when a vehicle lamp composed of a plurality of LED light sources has the functional requirement of dynamically displaying or independently controlling the individual switch, dimming, text or information display of each LED light source, the light source drive control circuit scheme of the present disclosure may also be used to achieve the function. As shown in FIG. 13-1 and FIG. 13-2, the in FIG. 13-1 is a high side driver, and the in FIG. 13-2 is a low side driver, both can be applied to the LED light source 190.

The present disclosure further provides an OLED lamp, which uses the above OLED light source drive control circuit. The OLED light source drive control circuit has been described in detail, and will not be described herein.

In summary, the present disclosure uses the differential bus communication method, which has a stronger anti-interference ability than the traditional I2C or SPI communication line. The present disclosure adopts the circuit combining the front-end DC/DC constant voltage module and the back-end linear constant current module, which effectively improves the circuit conversion efficiency of the entire drive system, reduces the power consumption and heat generated by the driver, and can effectively reduce the area of drive board. The present disclosure can effectively reduce the external radiation interference of the switching power supply circuit, and make the EMC test much easier to pass. The present disclosure simplifies the control circuit framework to reduce the PCB occupation rate, reduces the required number of I/O ports or PWM ports of MCU, and can reduce the OLED fault shutdown current, which makes it easy for the lamp to meet the current demand of the BCM of the vehicle body for fault diagnosis. The present disclosure can prevent the OLED current from being reduced due to insufficient output voltage (insufficient voltage difference) originally set for the back-end linear constant current driver after the voltage of the OLED panel increases due to aging problems, thereby maintaining a constant luminous flux output of the OLED. The OLED light source can be driven by maintaining a preset constant output limit power to avoid excessive overheating of the entire lamp system. The present disclosure can reduce the current flowing through the OLED or turn off the OLED light source to avoid damage to the OLED by high temperature. Therefore, the present disclosure effectively overcomes various shortcomings and has high industrial utilization value.

The above-mentioned embodiments are just used for exemplarily describing the principle and effects of the present disclosure instead of limiting the present disclosure. Those skilled in the art can make modifications or changes to the above-mentioned embodiments without going against the spirit and the range of the present disclosure. Therefore, all equivalent modifications or changes made by those who have common knowledge in the art without departing from the spirit and technical concept disclosed by the present disclosure shall be still covered by the claims of the present disclosure.

We claim:

1. An OLED light source drive control circuit, comprising: a DC/DC constant voltage module, an external transceiver, a first internal transceiver, a microcontroller unit, a linear constant current module, and an OLED panel light source; wherein the DC/DC constant voltage module is connected with a positive pole of a vehicle power line, and outputs power to the external transceiver, the first internal transceiver, the microcontroller unit, and the linear constant current module, respectively;

one end of the external transceiver is connected with a vehicle communication line, and the other end of the external transceiver is connected with the microcontroller unit, the external transceiver receives a control signal transmitted by the vehicle communication line and transmits the control signal to the microcontroller unit for the microcontroller unit to execute a control instruction corresponding to the control signal;

the microcontroller unit communicates with the first internal transceiver, detects an output voltage of the linear constant current module, feeds back the detected output voltage to the DC/DC constant voltage module for the DC/DC constant voltage module to adjust the output voltage output to the linear constant current module, and controls the DC/DC constant voltage module to operate according to the detected output voltage or a voltage fed back by the linear constant current module;

the first internal transceiver is connected with the linear constant current module through a differential bus to transmit a signal between the microcontroller unit and the linear constant current module;

the linear constant current module comprises a plurality of linear constant current driver ICs, the plurality of linear constant current driver ICs each contains a second internal transceiver, and a differential bus interface of the second internal transceiver is connected with a differential bus communication line connecting with a differential bus interface of the first internal transceiver, to communicate with the differential bus interface of the first internal transceiver;

the OLED panel light source comprises a plurality of OLED panels corresponding to the plurality of linear constant current driver ICs respectively, each of the plurality of OLED panels is controlled to emit light by an output channel of the each output channel corresponds to an OLED light-emitting area; and ground ends of the DC/DC constant voltage module, the external transceiver, the first internal transceiver, the microcontroller unit, the linear constant current module, and the OLED panel light source are respectively connected with a negative pole of the vehicle power line.

2. The OLED light source drive control circuit according to claim 1, wherein an anti-reverse circuit is further connected with a line between the DC/DC constant voltage module and the vehicle power line.

3. The OLED light source drive control circuit according to claim 2, wherein the anti-reverse circuit comprises an anti-reverse diode or an anti-reverse PMOS circuit.

4. The OLED light source drive control circuit according to claim 1, wherein the external transceiver is a LIN transceiver, the vehicle communication line is a LIN communication line; or the external transceiver is a CAN transceiver, and the vehicle communication line is a CAN communication line.

5. The OLED light source drive control circuit according to claim 1, wherein the external transceiver is integrated into the microcontroller unit, and a low dropout regulator (LDO) is further integrated into the microcontroller unit.

6. The OLED light source drive control circuit according to claim 1, wherein each of the plurality of linear constant current driver ICs includes a plurality of output channels correspondingly connected with a plurality of light emitting areas in an OLED panel.

7. The OLED light source drive control circuit according to claim 6, wherein a number of the plurality of linear constant current driver ICs multiplied by a number of the plurality of output channels on a ≥a number of the OLED panels multiplied by a number of the plurality of light emitting areas on an OLED panel.

8. The OLED light source drive control circuit according to claim 6, wherein an over-temperature detecting circuit is disposed adjacent to the OLED panel light source, and is connected with the microcontroller unit for detecting a temperature of the OLED panel light source, and transmitting the detected temperature to the microcontroller unit.

9. The OLED light source drive control circuit according to claim 8, wherein the over-temperature detecting circuit comprises:

a PCB circuit board; and a thermistor, a pull-up voltage dividing resistor, and an A/D sampling circuit disposed on the PCB circuit board, wherein
the thermistor is connected with the pull-up voltage dividing resistor, and
one end of the A/D sampling circuit is connected with a line between the thermistor and the pull-up voltage dividing resistor, and the other end of the A/D sampling circuit is connected with the A/D sampling port of the microcontroller unit.

10. The OLED light source drive control circuit according to claim 1, wherein a dynamic effect of the OLED light source is controlled by the differential bus; a differential bus protocol used by the differential bus includes a high-speed digital communication bus protocol based on a UART protocol combined with a local differential bus physical layer structure.

11. The OLED light source drive control circuit according to claim 1, wherein the first internal transceiver transmits a control signal with the second internal transceiver disposed in each of the plurality of linear constant current driver ICs, and the microcontroller unit transmits a control signal with the linear constant current module through the first internal transceiver.

12. The OLED light source drive control circuit according to claim 1, wherein a voltage of the OLED panel corresponding to the OLED light-emitting area on each channel of each of the plurality of linear constant current driver ICs is sampled through the differential bus communication line;

when the voltage of the OLED panel rises within a preset range, the microcontroller unit outputs a feedback signal to adjust the output voltage of the DC/DC constant voltage module, so that each of the plurality of linear constant current driver ICs has a sufficient voltage for increasing the voltage of the OLED panel; and when the voltage of the OLED panel rises beyond the preset range, the microcontroller unit outputs a feedback signal to increase the output voltage of the DC/DC constant voltage module to a preset limit voltage, to maintain a preset constant output limit power to drive the OLED panel light source.

* * * * *